United States Patent
Schilles

(10) Patent No.: US 7,967,935 B2
(45) Date of Patent: Jun. 28, 2011

(54) PRESS MOLDING TOOL AND METHOD FOR PRODUCTION OF A COMPONENT BY PRESS MOLDING

(75) Inventor: Wilfried Schilles, Sontra (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 681 days.

(21) Appl. No.: 11/663,069

(22) PCT Filed: Aug. 31, 2005

(86) PCT No.: PCT/DE2005/001524
§ 371 (c)(1),
(2), (4) Date: Jun. 27, 2007

(87) PCT Pub. No.: WO2006/029589
PCT Pub. Date: Mar. 23, 2006

(65) Prior Publication Data
US 2007/0257397 A1     Nov. 8, 2007

(30) Foreign Application Priority Data

Sep. 18, 2004  (DE) .......................... 10 2004 045 398
Sep. 18, 2004  (DE) .......................... 10 2004 045 399
Sep. 18, 2004  (DE) .......................... 10 2004 045 400

(51) Int. Cl.
*B29C 51/20* (2006.01)
*B29C 51/38* (2006.01)

(52) U.S. Cl. ........ 156/222; 156/267; 156/443; 156/510; 156/581; 156/583.1

(58) Field of Classification Search ........... 425/DIG. 48, 425/292, 397, 408; 156/222, 224
See application file for complete search history.

(56) References Cited

U.S. PATENT DOCUMENTS

| | | | | |
|---|---|---|---|---|
| 4,923,539 A * | 5/1990 | Spengler et al. | ................ | 156/79 |
| 5,413,661 A | 5/1995 | Spengler et al. | | |
| 6,136,415 A | 10/2000 | Spengler et al. | | |
| 2001/0000584 A1 * | 5/2001 | Spengler | .................... | 156/309.6 |
| 2006/0027315 A1 * | 2/2006 | Merino Rojo et al. | ........ | 156/247 |

FOREIGN PATENT DOCUMENTS

| | | |
|---|---|---|
| DE | 2925500 A1 | 1/1980 |
| DE | 79 06 115 | 8/1980 |
| DE | 30 30 537 A1 | 3/1982 |
| DE | 33 38 513 A1 | 5/1985 |
| DE | 43 05 189 A1 | 8/1994 |
| DE | 44 19 908 A1 | 12/1995 |
| DE | 196 29 196 A1 | 1/1998 |
| EP | 1211051 A | 6/2002 |
| JP | 63191615 A | 8/1988 |
| WO | 9964221 A | 12/1999 |

* cited by examiner

*Primary Examiner* — John L. Goff
*Assistant Examiner* — Barbara J. Musser
(74) *Attorney, Agent, or Firm* — Crowell & Moring LLP

(57) ABSTRACT

The Invention relates to a device for the production of a component from at least one first layer (1) and a second layer (2) with clamping frame elements (21,22), moving relatively towards each other to fix the layers in a given manner during the forming process outside the form range of the tool and a cutting device (300) arranged on the first clamping frame element, for cutting a projection of the second layer extending between the first and the second tool piece and method for carrying out the cutting process.

15 Claims, 2 Drawing Sheets

PRESS MOLDING TOOL AND METHOD FOR PRODUCTION OF A COMPONENT BY PRESS MOLDING

CROSS-REFERENCE TO RELATED APPLICATION

This application is [a National Stage entry of International Application No. PCT/DE2005/001524, filed Aug. 31, 2005, the entire specification claims and drawings of which are incorporated herewith by reference.

The invention relates to a press molding tool and to a method for production of a component by press molding.

For production of components of this type, it is known from the prior art to use an upper tool and a lower tool in order to mold a support layer and a decoration layer into a predetermined component shape by pressing them together and in order to connect them to each other. During the molding of the layers into a component shape with a three-dimensional curvature or contour, there is the problem that the materials tend to crease when the upper tool and the lower tool are moved together. These creases are then permanently pressed into the materials and result in the component produced not being able to be used. For this reason, use is made of a clamping frame with which the decorative material or the mat is clamped and is held in a predetermined manner in order to prevent creases from forming on the component in the region between the lower tool and the upper tool.

DE 29 25 500 A1 discloses a press for production of laminated, sheetlike molded parts from a preferably thermoplastic support layer and a flexible laminating layer. The press has two profiled pressing plates which are movable with respect to each other and of which one is provided with a shearing edge in order to form a first cutting device, which shearing edge interacts with a ring-like element as the counterposition. The press has a second cutting device which is formed by a blade, which is connected to the other profiled pressing plate, and by a surface of the ring-like element. The two cutting devices are spaced apart from each other in a plane transverse with respect to the common cutting direction. By means of this arrangement, the support layer and the laminating layer are clamped and cut as the presses move together such that stresses occur in the layers within the molding region. As a result, the quality of the component is negatively affected.

It is the object of the invention to provide a press molding tool and a method for production of a component by press molding, with which trimming of the layers placed into the production apparatus is achieved, wherein high component quality can be achieved.

This object is achieved by the features of the independent claims. Further embodiments according to the invention are described in the subclaims which refer back to said independent patent claims.

According to the invention, a press molding tool is provided for production of a component from at least one first material layer and one second material layer with at least one first tool part and one second tool part each having a three-dimensional molding contour, wherein, when the first material layer and the second material layer are placed into the apparatus, the molding contour of the first tool part faces the first material layer and the molding contour of the second tool part faces the second material layer, wherein the tool parts are clamped in a pressure transducer in order to bring about the molding of the first material layer and of the second material layer and the connection of the two material layers to each other by moving the first and the second tool parts together, and with a clamping frame device in order to hold the material layers in their closed position outside the contour region of the tool during the molding operation, wherein the clamping frame device comprises a first clamping frame element which is movable relative to the first tool part by means of a first adjusting device, and a second clamping frame element which is movable relative to the second tool part by means of a second adjusting device, the clamping frame elements being arranged for retaining the at least two material layers, and at least one spacer element for spacing apart the clamping frame elements in the closed position of the same being arranged at least on one of the clamping frame elements such that, in the closed position of the clamping frame elements and during a pressing operation carried out by means of the tool parts, a continued flowing of at least one of the inserted material layers is permitted, and wherein the press molding tool comprises a cutting device with a blade which, as seen in the in the opening and closing direction, runs in a segmental manner on the circumference of the tool parts or completely encircles the latter, for cutting off an excess length of the material layers, which excess length is present next to the first and the second tool part during the press molding and is movable relative to the first or second clamping frame element.

Even in the case of a completely encircling blade, the blade can be divided in a segmental manner in the encircling direction.

The at least one spacer element can be of settable design, with it being possible for the setting of at least one spacer element to take place mechanically or via a control device.

A respective spacer element can be arranged on each of the clamping frame elements, which spacer elements come to bear against one another in the closed position.

The cutting movement of the blade of the cutting device can run parallel to or transversely to the adjusting movement of the tool parts.

The blade of the cutting device can be heated by means of a heating device. The heating device of the blade can have a receptacle for at least one heating cartridge which can be inserted therein. Alternatively, the heating device of the blade can have electric resistance heating.

The cutting device can be designed in such a manner that, in the closed position of the clamping frame elements, the blade can be positioned in such a manner that, in its initial position, it does not touch the material layers placed into the clamping frame.

The movability of the blade can be brought about by an electric, hydraulic or pneumatic drive or by a manual actuating device.

The blade can be arranged in such a manner that, in its cutting position, it at least partially protrudes through the first clamping frame element.

According to the invention, a method is furthermore provided for production of a component by press molding of a first and of a second material layer, during which the two layers are connected within the molding contours of two tool parts by moving the latter together, the first tool part and the second tool part having been moved apart in an initial position. Here, the following steps are provided:

(a) moving the first clamping frame element and the second clamping frame element from the initial position into an extended position with respect to each other and placing the at least two material layers between the two tool parts, with the first and the second clamping frame elements being arranged outside the molding contours of the tool parts, (b) moving the first clamping frame element and the second clamping frame element into a position until they are spaced apart from at least one spacer element arranged on at least one of the clamping frame elements such that the first and the second material layer are retained by the first and the second clamping frame element at a predefined distance of the mutually facing surfaces of the clamping frame elements, (c) moving the tool parts together relative to each other and carrying out the press molding in the region of the molding contours of the tool parts, (d) cutting off an excess length of at least one of the two material layers, which excess length is present between the first and the second tool part, by means of a blade of a cutting device, the blade being moved during the cutting operation in such a manner that a corresponding region of the bearing region of the second clamping frame element, which bearing region faces the cutting edge of the blade, or of one of the tool parts acts as the counterposition for the cutting edge during the cutting operation, (e) moving the tool parts and the clamping frame elements apart in order to be able to remove the press-molded and interconnected first and second material layers from the tool.

The invention is described below with reference to the attached drawings, in which.

Figure 1:
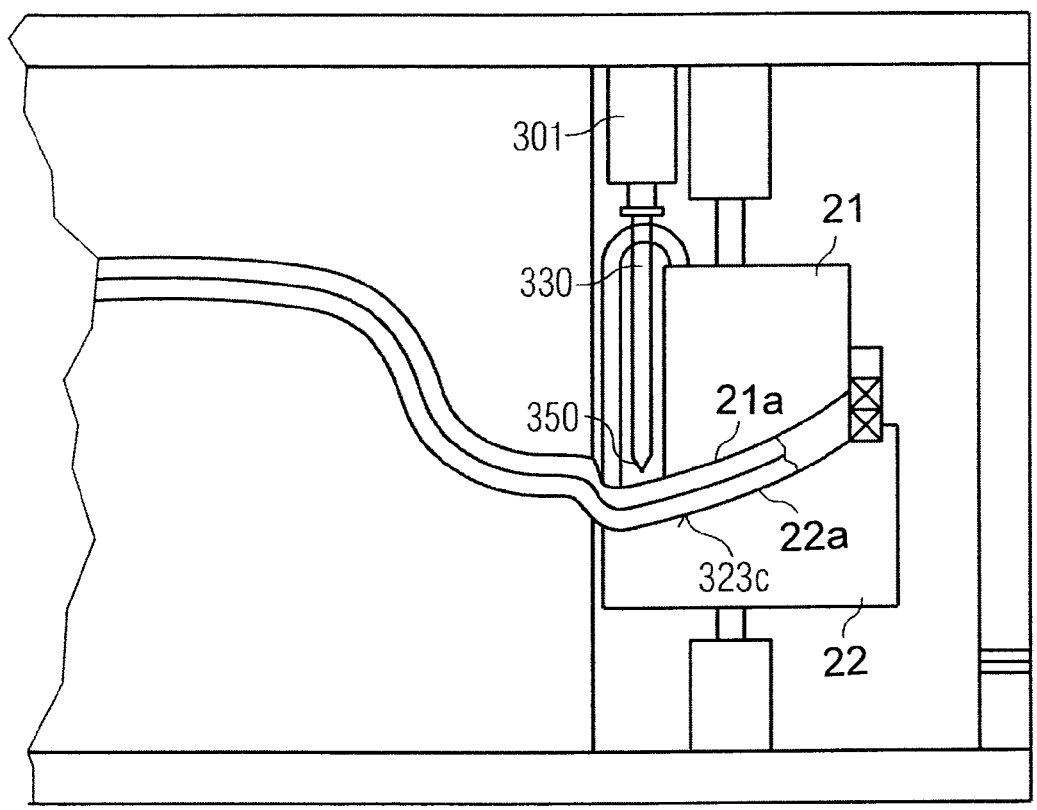
FIG. 1 shows a first embodiment of the press molding tool according to the invention with a cutting device in a closed position in which the press molding tool is in a closed position and a first and a second clamping frame element have been moved together.

The press molding tool according to the invention and the method for production of a component by press molding relate to the production of a component from at least one first material layer 1 and at least one second material layer 2. The layers can be, for example, a decoration layer and a support layer. With the tool and the method, molding of the first layer and of the second layer and the connection of the two layers to each other take place by moving together a first tool part, which faces the first material layer, and a second tool part, which faces the second material layer, of the press molding tool. In general, both layers can be multi-layered, with it also being possible for a plurality of layers of the first layer or of the second layer to be molded and connected to one another by the method and the apparatus according to the invention. In the description below, a single- or multi-layered material layer, which is intended for bearing against the contour-shaping region of the first tool part, is referred to as the first material layer. Analogously, a single- or multi-layered material layer, which is intended for bearing against the contour-shaping region of the second tool part, is referred to below as the second material layer. In general, the first and the second material layers are layers which can be connected to one another under pressure, for example can be fused or interlocked at least in some regions.

One of the two material layers in the component to be produced is preferably a decoration layer and the other of the two layers is a support layer. Embodiments of the invention are described below, in which the first material layer is a decoration layer and the second material layer is a support layer. However, it is also possible that, conversely, the first material layer is a support layer and the second material layer is a decoration layer. Also, one of the two layers does not have to be a decoration layer or support layer. For example, the first and the second layers can be two support layers or two intermediate layers or one support layer and a reinforcing layer, such as, for example, a layer made of glass cloth.

In the case of production of the component with a support layer and a decoration layer, the mutually facing sides of the decoration layer and of the support layer have to be connectable to each other by pressure exerted by the tool and, if appropriate, with the use of heat. For this purpose, that material layer of the decoration layer which faces the support layer can have the property of connecting mechanically to the support layer under pressure, for example by mechanical interlocking of threads or hairs provided on the mentioned side of the decoration layer with the possibly fused-on surface of the support layer. For this purpose, at least the surface of the decoration layer, which surface faces the support layer, can be formed from a woven cloth which can be, for example, a fleece, a felt, a flat cloth, or a circular knit. The decoration layer can also be connected to the support layer by fusing the mutually facing surfaces with the use of pressure by the tool and, if appropriate, with the use of heat. Fusing is achieved if the decoration layer contains foam constituents which belong to the same family of materials as the support layer provided for the fusion.

As the decoration layer, use can be made here of a textile cloth, an expanded leather cloth, a plastics sheet or a leather. If a textile cloth is used as the decoration layer, a layer of textile materials or sheets or a combination of the alternatives mentioned can be used for the starting material. In the case of the component to be produced, a decoration layer can also be provided in order to optimize the haptic properties of the end product on the corresponding side of the component. For this purpose, the decoration layer can also have foam constituents. For example, the decoration layer can be a composite of textile materials, a foam and a fleece material. The foam used can be a PP foam or PE foam or a foam built up on PU.

As the support layer, in particular a plastic and especially a polypropylene (PP)-bound fiber mat is provided. Said support layer can be in particular plasticized by the supply of heat. The support layer is preferably formed from a fiber material, preferably of natural fibers or glass fibers and of plastic fibers and, in particular, polypropylene (PP) fibers. The natural fibers can be formed from flax or kenaf, sisal, linen or cotton. In this case, said fibers are shaped to form a mat in a preparatory step or a step preceding the method. Subsequently, an interconnected plastic mat material is formed as a first or second layer with fusion of the plastic components under application of pressure and temperature.

The invention is described below with reference to an embodiment of a press molding material with a cutting device and with reference to a method for production of a component by press molding and with a cutting operation in which the cutting apparatus according to the invention can be used.

The press molding material according to the invention for production of a component from at least one first material layer 1, a decoration layer in the embodiment described, and one second material layer 2, a support layer in the embodiment described, is a molding tool 10 which determines the contour of the component to be produced from the material layers and has at least one first tool part 11, which faces the first layer and has a three-dimensional molding contour 13, and one second tool part 12, which faces the second layer and has a three-dimensional molding contour 14. The tool parts 11, 12 are moved toward each other by a pressure transducer (not illustrated) in order to bring about the molding of the first material layer 1, or the decoration layer, and of the second material layer 2, or the support layer, and the connection of the two material layers 1, 2 to each other by moving the first and the second tool parts 11 and 12 together. The first tool part 11 can be fitted to a first tool holder or an installation plate 15 and a second tool part 12 can be fitted to a second tool holder or an installation plate 16.

The press molding tool according to the invention furthermore has a clamping frame device 20 with clamping frame elements which are movable with respect to one another and in relation to the tool parts 11, 12, in order to hold the material layers 1, 2 in a predetermined manner outside the contour region of the tool during the molding operation. Said clamping frame device comprises a first clamping frame element 21 which is movable relative to the first tool part 11 by means of a first adjusting device 31, and a second clamping frame element 22 which is movable relative to the second tool part 12. The movability of the clamping frames 31, 32, 33 refers at least to the movability in the direction of the opening and closing movement of the tool parts 11, 12. The clamping frame elements 21 and 22 are guided in their direction of movement via the adjusting devices 31, 32 and/or via separate guides.

The first and second adjusting devices 31 and 32 are devices which are activated by a control device for automatic control, or, if appropriate, additionally via an actuating device for manual or semi-automatic control, of the production process in order to move the respective clamping frame elements 21, 22. The second adjusting device 32 is preferably coupled mechanically to the second tool part 12, for example by being fitted on a second tool holder or a second installation plate 16. However, the second adjusting device 32 can also be arranged on a support (not shown) which is independent of the position of the second tool part 12 such that, in this case, its extension position is independent of the position of the second tool part 12.

The clamping frame elements 21, 22 are each arranged outside the contour-shaping regions of the tool parts 11, 12. Said clamping frame elements can be formed as a single piece and designed as a structure which encircles the tool parts 11, 12. The clamping frame elements can also be formed in a number of parts along the circumference or along a region of the circumference of the tool parts 11, 12 and in a manner encircling the tool parts 11, 12 in some regions. A clamping frame element can also be formed from two parts which are arranged at locations outside the tool parts 11, 12. These locations can be situated in particular diametrically opposite each other. It is also possible for a plurality of parts, for example three or four parts, of a clamping frame element to be arranged outside the circumference of the particular tool part 11 or 12 or of the tool parts 11, 12 in a regular or irregular distribution about the latter, depending in each case on the application.

The clamping frame elements can be formed differently. The construction and arrangement of the clamping frame elements depends on the type, material and design of the component to be produced and on the type, material and design of the materials. The clamping frame elements 31, 32 each have a bearing region or two bearing regions which is or are provided during the production of the component for the purpose of an excess length region of the first and/or second layer being able to be placed against it and/or them. The first clamping frame element 21 and the second clamping frame element 22 each have a bearing region. The bearing region 21a of the first clamping frame element 21 faces a first bearing region 22a of the second clamping frame element 22. These bearing regions 21a and 22a are each designed in such a manner that a holding of an excess length region of the first and second material layers 1 and 2 is possible as the clamping frame elements 21 and 22 are correspondingly moved together. The holding can comprise clamping or retention, in particular with the possibility of the layers 1, 2 continuing to flow, or a combination of these functions.

In addition, machining of the layers and, in particular, trimming of the outer regions of the layers can take place subsequently independently of each other. Depending on the application, it can be provided, in particular by means of a special coating, that a bearing region or a plurality of bearing regions inhibits or inhibit the continued flowing of one or both of the layers 1, 2. The mutually facing bearing regions 21a, 22a do not absolutely have to run parallel to each other. The bearing regions 21a, 22a can be coated in some regions or over the entire surface or can be provided with corresponding inserts in order, depending on requirements, to facilitate or make it more difficult for the layer 1 or 2 retained between the two clamping frame elements 21, 22 to continue flowing. In order to facilitate a continued flowing of a layer 1 or 2, the respective bearing regions or segments arranged thereon can contain, for example, polytetrafluoro ethylene (PTFE) constituents or can have a relatively low surface roughness. For this purpose, the respective bearing regions or segments arranged thereon can also have a metallic coating which, for example, is applied by electro-plating. In order to make it more difficult for a layer 1 or 2 to continue flowing, the respective bearing regions can contain friction-increasing constituents or segments. For this purpose, a suitable surface structure can also be provided.

The respective bearing regions 21a, 22a, which are provided for holding a layer 1 or 2, or segments arranged on said bearing regions and/or the tool parts 11 or 12 can be designed in a manner such that their temperature can be controlled entirely or in some regions by means of a temperature control device. In this case, all of the bearing regions 21a, 22a or an individual bearing region or only two mutually facing bearing regions or else just one tool part 11 or 12 can be temperature controlled entirely or in some regions. The temperature control device which can be arranged for this purpose is designed in such a manner that it can be used to set or regulate a temperature of the bearing region or of the segment constantly or as a function of time or process. The setting can be realized by means of a control, also with the aid of temperature sensors, in the bearing region or segment to be temperature-controlled in each case. The alternative regulation takes place on the basis of the temperatures, which are detected by means of temperature sensors, on the bearing region or segment to be temperature-controlled in each case.

By controlling the temperature of at least one bearing region or segment, the play of guides or fits or the spacing of movable parts can be optimized and, in particular, can be reduced, since the expansions of movable parts caused by the temperature changes can be set within predefined limits. The accuracy of the tools, the operational reliability and reliability of the production apparatus can thereby be improved.

A further advantage which can be achieved by controlling the temperature of at least regions of the bearing surfaces or segments or of at least one clamping frame element of the clamping frame device 20 or of one or more of the molding tools 10 is that the formation of condensed water on a supercooled tool or clamping frame surface can be prevented. This also prevents the layers from being cooled, said cooling making it more difficult and even preventing the layers from being able to be molded and connected to each other.

The temperature control mentioned makes it possible to prevent regions of the bearing surfaces or segments from overheating. Overheating of this type would, in particular, negatively influence the surface structure of the component to be produced, as a result of which, in particular, a possibly desirable bowing effect, such as, for example, anti-dazzle effect, could be prevented. Therefore, it is advantageous, during the temperature control in particular also by means of a cooling mechanism, to provide a predefined process temperature.

The controlling of the temperature of one or both of the tool parts 11, 12, which control can be provided in addition or as an alternative to the controlling of the temperature of clamping frame elements, can be temperature-controlled by means of the abovementioned temperature control device or by means of a further temperature control device. In this case, a respective region on the molding contour 13 or 14 is temperature-controlled in order to bring or obtain the material used for the particular layer 1 or 2 to an advantageously processable state. A further advantage is that, by controlling the temperature of parts of the production apparatus, optimized configuration or operation of the same can take place.

The tool parts 11, 12 are movable with respect to each other between two positions by means of a tool advancing device (not illustrated). Each clamping frame element 21, 22 is also movable independently by means of a respectively correspondingly assigned adjusting device 31 and 32. Mechanical connection of the respective adjusting devices 31 and 32 to the tools 11, 12 enables the frequency of the required actuations of the adjusting devices to be reduced, since some of these can be undertaken by the press. The positions between which the clamping frame elements are movable, and the positions between which the tool parts are movable at the same time, are provided in such a manner that the first and the second layers 1, 2 can be inserted between the tool parts that have been moved apart and the layers can also be molded and pressed on while, at the same time, those excess length regions or edge regions of the layers 1, 2 which are placed outside the molding contours 13, 14 are secured in such a manner that, over the course of the tool parts 11, 12 being moved together, continued flowing of one or both of the layers is temporarily possible.

According to the invention, for this purpose, at least one spacer element 41, 42 for spacing apart the clamping frame elements 21, 22 in the closed position of the same is arranged at least on one of the clamping frame elements 21, 22. As a result, in the closed position of the clamping frame elements 21, 22 and during a pressing operation carried out by means of the tool parts 11, 12, continued flowing of at least one of the inserted material layers 1, 2 is permitted.

The extension positions of the advancing devices for the tool parts or the clamping frame elements can be coupled to one another. Alternatively, partial or complete independence of the extension positions can be realized, for example by the adjusting device for the tool and the adjusting device for a clamping frame element assigned to said tool being arranged or fitted independently of each other mechanically.

The adjusting device positions required in the production method and therefore the retraction and extension positions of the tool parts 11, 12 and of the clamping frame elements 21, 22 can be achieved by means of sensors and a comparison of the particular desired and actual position in a corresponding control device. In this case, it can be provided that the sensors detect the position of a corresponding actuating element in the respective advancing device or the position of the respective clamping frame element or tool part itself.

Alternatively, the designated retraction and extension positions of the clamping frame elements 21, 22 can be achieved via mechanical limiting elements. In a special embodiment, each adjusting device needs to be moved to and fro only in a predefined sequence between two opposite end positions, in a manner controlled via an assigned control device, in order to fulfill the correct function for the production method according to the invention. The saving of sensors and a control based on a desired-actual comparison for the respective extension position of each adjusting device makes this embodiment of the production apparatus cost-effective.

For this purpose, two spacers 51, 52 connected to the tool parts 11 and 12 can be integrated in the press molding tool. The pressing position of the tool parts 11, 12 is able to be defined by said spacers. These spacers 51, 52 can also be omitted.

When the spacers are configured as height-changeable spacers, they can be extended via an actuating drive, which is functionally connected to the control device, in order to bring about the spacing, which is required in phases, of the respectively interacting clamping frame elements by means of a corresponding extension position of the particular spacer at a particular moment. In addition to such an electronically controlled adjustment of the spacers, the latter can alternatively also be controlled hydraulically or via a radial cam. Such a radial cam for the clamping frame elements preferably takes the respective positions of the tool parts into consideration.

Figure 2:
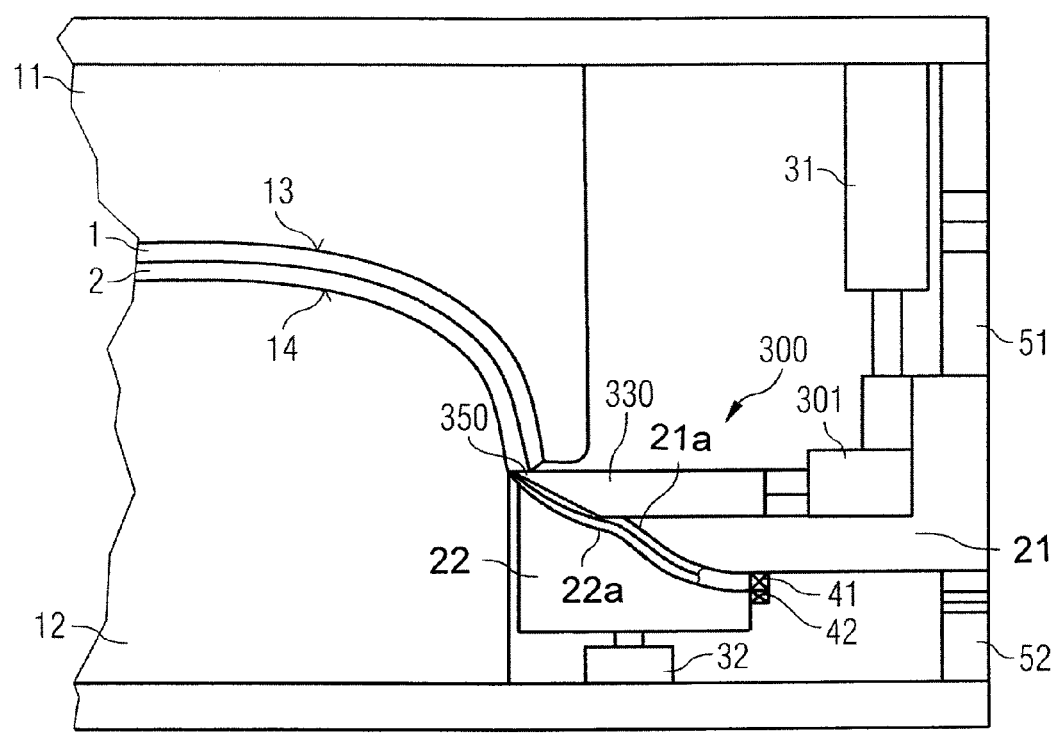
FIG. 2 shows an alternative embodiment of the press molding tool according to the invention with an alternative cutting device in a closed position.

In the illustrated embodiment of the pressing tool according to the invention, a respective distancing element 41, 42 is arranged on each clamping frame element 21, 22. In general, at least one spacer element 41, 42 is arranged at least on one of the clamping frame elements 21, 22. Alternatively, a respective spacer element can be arranged on each of the clamping frame elements 41, 22, which spacer elements come to bear against each other in the closed position (FIGS. 1 and 2). A plurality of spacer elements can also be arranged on each of the clamping frame elements 41, 22.

A distancing element 41, 42 can be designed as a rigid distancing element or a distancing element which is height- or length-changeable and settable in the direction of the movements or corresponding relative movements of the clamping frame elements. The setting of the at least one spacer element can also take place mechanically or via a control device. When distancing elements which are fixed with respect to the movements of the clamping frame elements, i.e. are not height-changeable, are used, movement of the respective clamping frame elements together results in a defined distance between them with respect to the material layers 1, 2 during the production process. When height-changeable distancing elements are used, the end positions of the clamping frame elements defined by these are, the continuing-flowing and clamping behavior of the clamping frame elements with regard to the layers 1, 2 respectively held can be changed. The effect achieved by this is that, in each position of the tool parts, a continued flowing of the layers 1 and 2 held by the clamping frame elements is ensured, if this is required by the molding contour provided by the tool parts 11, 12, in order to produce the component in the designated form, thickness and strength in a crease-free manner.

The tool parts 11, 12 are movable via a tool intermediate position into a closed position or pressing position or laminating position (FIGS. 1 and 2).

According to the invention, a cutting device 300 is provided with a blade or cutting blade 330 which is movable by an advancing device 301 and, if appropriate, is guided by a mechanism with a guide in order to trim the first material layer 1 and optionally also the second material layer 2.

The advancing device of the cutting device 300 and the mechanism with the guide are designed in such a manner that the cutting movement of the blade 330 runs parallel (FIG. 2) or vertically or at another angle, i.e. generally transversely (FIG. 1), to the adjusting movement of the tool parts. The angle of the cutting movement is in a functional interrelationship with the profile of the surface, which faces the blade 330, of the material layer to be cut in each case or of the material layers to be cut.

The surface of that contour of the cutting edges 350 of the blade 330 which is effective for the cutting operation is preferably directed at 90° plus or minus an angular region relative to the surface, which faces the blade, of the material layer to be cut. The angular region for the orientation of the cutting edge depends on the edge to be formed on the material layers and on the type and composition of the materials to be cut.

The cutting edge 350 of the cutting blade 330 can be designed in particular as a contour-dependent cutting surface, i.e. as a three-dimensional cutting surface. The cutting blade 330 can be formed as a blade which surrounds the tool parts 11, 12 in some regions or segmentally. The blade 330 can also be in the form of an encircling blade. The blade here can be formed in an encircling manner as a single part or can be constructed in segments. If the blade is formed in an encircling manner as a single part, the advancing movement for the blade preferably runs in the closing or opening direction of the tool parts 11, 12. During a cutting movement of the blade at an angle to the closing or opening direction of the tool parts 11, 12, the blade 330, for geometrical reasons, is to be provided on the circumference of the tool parts 11, 12 in some regions or in segmental form.

The cutting blade 330 can be designed either as a thermal or mechanical blade. In the embodiment as a thermal blade, the latter is able to be heated, for example via a resistor. By heating the blade, a sealing function can be fulfilled, in particular in the case of temperature-sensitive material layers.

The embodiment, illustrated in FIG. 1, of a cutting device 300 has a blade which is movable in the adjusting movement of the tool parts and can be, for example, a thermal blade or a cutting blade 330. In the case of this cutting device, the blade is arranged movably within a groove or cutout which runs in the adjusting direction of the tool parts in the first clamping frame element 21. The bearing region 22a of the second clamping frame element 22 is used as a counterposition for the cutting force to be applied.

Alternatively, the cutting device 300 can also be arranged on or in the second clamping frame element 22. A cutting device 300 can also be arranged both in the first clamping frame element 21 and in the second clamping frame element 22. In this case, the bearing region of the respectively opposite clamping frame element is used as the counterposition. The blades can be positioned, as seen in the cutting direction thereof, one above another or offset with respect to one another.

FIG. 1 shows the cutting device 300 in its initial position while FIG. 2 shows the state of an alternative cutting device after the cutting movement has been carried out.

It can be provided that the embodiments of the cutting device according to the invention is provided to sever just one layer, to be precise the closest material layer, or a plurality of or all of the material layers.

The cutting device 300 illustrated in FIG. 2 has a blade 330 which can be actuated at an angle transversely with respect to the adjusting or closing movement of the tool parts 11, 12. In this embodiment, a corresponding region of the press molding tool is used as the counterposition for the cutting force to be applied, said region, in the embodiment shown, being part of the second tool part 12. In the embodiment illustrated, the cutting device or the blade is arranged on that side of the first clamping frame element 21 which lies opposite the second clamping frame element 22.

Alternatively, the blade can be arranged between the first clamping frame element 21 and the second clamping frame element 22.

The cutting process by means of the cutting device 300 is as follows:

On the basis of the actuation of a corresponding actuating drive of the blade 330, the latter is moved up to a corresponding region of the counterposition which faces the cutting edge of the blade. The excess length of at least one of the material layers respectively facing the blade is then cut off by the pressure or the temperature applied on the basis of the advancing movement of the blade 330.

A method for production of a component by press molding of a first and a second material layer, during which the two layers are connected within the molding contours 13, 14 of two tool parts 11, 12 by moving the latter together, the first tool part 11 and second tool part 12 having been moved apart in an initial position, with the following steps:
    (a) from the initial position moving the first clamping frame element 21 and the second clamping frame element 22 into an extended position with respect to each other and placing the at least two material layers 1, 2 between the two tool parts 11, 12, with the first and the second clamping frame elements being arranged outside the molding contours 13, 14 of the tool parts,
    (b) moving together the first clamping frame element 21 and the second clamping frame element 22 into a position until they are spaced apart from at least one spacer element arranged on at least one of the clamping frame elements such that the first material layer 1 and the second material layer 2 are retained by the first clamping frame element 21 and the second clamping frame element 22 at a predefined distance of the mutually facing surfaces of the clamping frame elements,
    (c) moving the tool parts together relative to each other and carrying out the press molding in the region of the molding contours 13, 14 of the tool parts 11, 12,
    (d) cutting off an excess length of at least one of the two material layers, which excess length is present between the first and the second tool part, by means of a blade 330 of a cutting device 100, the blade being moved during the cutting operation in such a manner that a corresponding region of the bearing region 23a of the second clamping frame element 22, 23, which bearing region faces the cutting edge 350 of the blade 330, acts as the counterposition 323c for the cutting edge 350 during the cutting operation,
    (e) moving the tool parts 11, 12 and the clamping frame elements 21, 22 apart in order to be able to remove the press-molded and interconnected material layers 1, 2 from the tool.

Before the material layers 1, 2 are placed between the tool parts, heating of the first or of the second material layer can take place.

The invention claimed is:

1. A press molding tool for production of a component from a first material layer and a second material layer comprising:
    at least one first tool part and at least one second tool part, each of the tool parts having a three-dimensional molding contour, the molding contour of the first tool part facing the molding contour of the second tool part when the first material layer and the second material layer are placed into the apparatus, the tool parts being clamped in a pressure transducer in order to bring about molding of the first material layer and of the second material layer and connection of the first and second material layers to each other by moving the first and the second tool parts together, a clamping frame device to hold the material layers in position outside the molding contours during molding, and a cutting device with a blade disposed adjacent the clamping frame device, which blade, runs in a segmental manner on the circumference of the tool parts or completely encircles the tool parts, for cutting off an excess length of all the material layers that have been molded by the tool parts, which excess length is present next to the first and second tool parts during press molding, the cutting device being movable relative to the first clamping frame element or the second clamping frame element, with the blade being moved in such a manner that a corresponding bearing region of the second clamping frame element, which bearing region faces a cutting edge of the blade, or one of the tool parts, acts as a counterposition for the cutting edge during cutting, wherein the clamping frame device comprises a first clamping frame element movable relative to the first tool part by way of a first adjusting device and a second clamping frame element movable relative to the second tool part by way of a second adjusting device, the clamping frame elements are arranged for retaining the material layers, and at least one spacer element for spacing apart the clamping frame elements in the closed position of the clamping frame elements arranged at least on one of the clamping frame elements such that, in the closed position of the clamping frame elements and during a pressing operation carried out by way of the tool parts, a continued flowing of at least one of the first and second material layers is permitted.

2. The press molding tool as claimed in claim 1, wherein said at least one spacer element is of settable design.

3. The press molding tool as claimed in claim 2, wherein said at least one spacer element is set mechanically or via a control device.

4. The press molding tool as claimed in claim 1, wherein said at least one spacer element is one of several spacer elements respectively arranged on the clamping frame elements, which spacer elements come to bear against one another in the closed position.

5. The press molding tool as claimed in claim 1, wherein the blade of the cutting device has a cutting movement that runs parallel to an adjusting movement of the tool parts.

6. The press molding tool as claimed in claim 1, wherein the blade of the cutting device has a cutting movement that runs transversely with respect to an adjusting movement of the tool parts.

7. The press molding tool as claimed in claim 1, wherein the blade of the cutting device can be heated by a heating device.

8. The press molding tool as claimed in claim 7, wherein the heating device has a receptacle for at least one heating cartridge insertable therein.

9. The press molding tool as claimed in claim 7, wherein the heating device is an electric resistance heating device.

10. The press molding tool as claimed in claim 1, wherein, in the closed position of the clamping frame elements, the blade can be positioned in such a manner that, in its initial position, it does not touch the material layers when they are placed into the clamping frame.

11. The press molding tool as claimed in claim 1, wherein the movability of the blade is brought about by an electric, hydraulic or pneumatic drive.

12. The press molding tool as claimed in claim 1, wherein movability of the blade is brought about by a manual actuating device.

13. The press molding tool as claimed in claim 1, wherein, in its cutting position, the blade at least partially protrudes through the first clamping frame element.

14. The press molding tool as claimed in claim 1, wherein at least one of the clamping frame elements is assigned a device for controlling the temperature of the clamping frame device.

15. A method for production of a component by press molding of first and second material layers, during which the material layers are connected within molding contours of first and second tool parts by moving the tool parts together, the first tool part and the second tool part having been moved apart in an initial position, comprising:

(a) moving a first clamping frame element and a second clamping frame element into an extended position with respect to each other and placing the first and second material layers between the first and second tool parts, with the first and the second clamping frame elements being arranged outside the molding contours of the tool parts, (b) moving the first clamping frame element and the second clamping frame element until they are spaced apart by at least one spacer element, arranged on at least one of the clamping frame elements to permit a continued flowing of at least one of the material layers in a closed position of the clamping frame elements, such that the first material layer and the second material layer are retained by the first clamping frame element and the second clamping frame element at a predefined distance of the mutually facing surfaces of the clamping frame elements, (c) moving the tool parts together relative to each other and carrying out the press molding in the region of the molding contours of the tool parts, (d) cutting off an excess length of all the material layers that have been press molded by the tool parts, which excess length is present between the first and second tool parts, by way of a blade of a cutting device disposed adjacent the first clamping frame element, the blade being moved in such a manner that a corresponding bearing region of the second clamping frame element, which bearing region faces a cutting edge of the blade, or one of the tool parts, acts as a counterposition for the cutting edge during cutting, and (e) moving the tool parts and the clamping frame elements apart in order to be able to remove the press-molded and interconnected first and second material layers.

* * * * *